April 14, 1970          H. M. VARNER          3,505,881
PRESSURE COMPENSATED ROTOR MOUNTING
Filed May 3, 1967
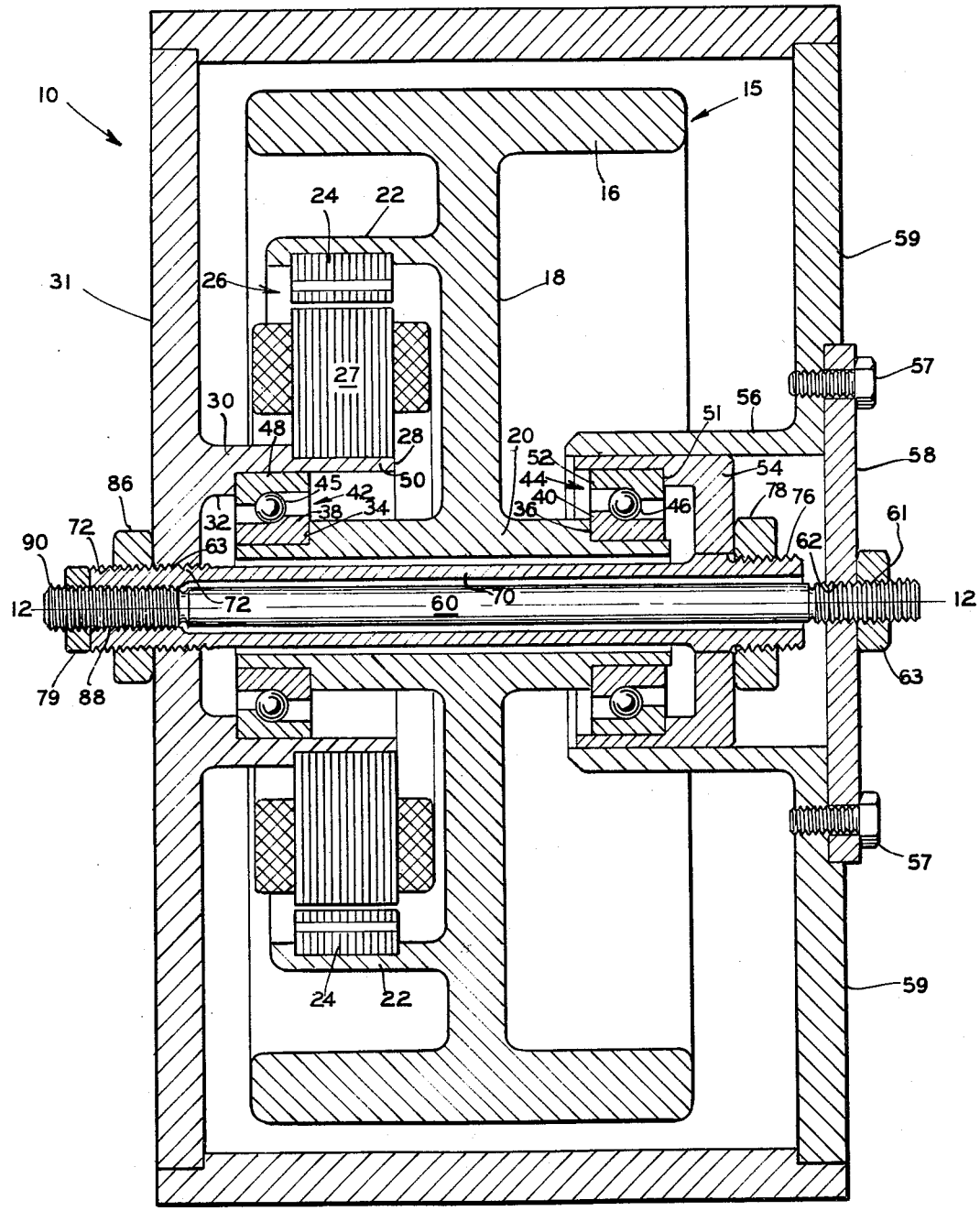
INVENTOR.
HORACE M. VARNER
BY Herbert L. Davis
ATTORNEY

United States Patent Office 3,505,881
Patented Apr. 14, 1970

3,505,881
PRESSURE COMPENSATED ROTOR MOUNTING
Horace M. Varner, Livingston, N.J., assignor to The Bendix Corporation, a corporation of Delaware
Filed May 3, 1967, Ser. No. 635,862
Int. Cl. G01c 19/16
U.S. Cl. 74—5                                    4 Claims

ABSTRACT OF THE DISCLOSURE

An assembly for mounting a hollow rotating member in a sealed casing, the casing being reinforced by a strut member extending through the hollow member and a cantilevered strut member attached to one end of the casing and extending through the hollow member, the cantilevered member being adjustable within the casing to preload the rotary ball bearings within which the rotor is mounted.

BACKGROUND OF THE INVENTION

Field of the invention

This invention relates to gyroscopes and reaction wheels generally and in particular to assembly and mounting of a rotary ball bearing for supporting a rotating element therein.

Prior art of the invention

Reaction wheels and gyroscopes used in a vehicle environment are usually mounted in sealed casings for dust and cover protection of the various, sensitive and movable elements therein. Such casings mount bearing assemblies preloaded against the various rotating elements therein. The preload value should be constant under varying temperature and pressure conditions. Since the operation of a high precision gyroscope and reaction wheel is dependent on temperature variations of the environment within the casing, the prior art has suggested various solutions for temperature compensation to maintain preload on the ball bearings such as by use of compressive and tensile strut members extending within a hollow rotor and mounted to opposing ends of the casing, as shown for example by a U.S. Patent No. 2,990,718 granted July 4, 1961 to Roland E. Barnaby.

The present invention offers a solution to the problem of maintaining bearing preload due to pressure differentials and the invention is susceptible to various compensating means for temperature compensation in conjunction with the invention herein. Since the casings are usually sealed, pressure changes on the housing often affect bearing preload. The pressure change, for instance, may be due to launch from the earth pressure into the vacuum of the orbit causing change of the pressure within the casing relative to the pressure external to the casing. Such a pressure change effects the bearing preload since the shaft or outer race of the bearings are mounted for rotation with respect to the opposite ends of the casings. The usual occurrence is that if the casing expands a slight amount, the bearing preload is decreased; while for the opposite condition, that is, if the casing contracts, the bearing preload would be increased.

The present invention provides a hollow cantilevered strut member extending axially within the hollow rotating element and operative with adjusting means to load the bearings. The cantilevered strut member maintains the constant predetermined preload value regardless of the pressure differential within and without the casing which may cause expansion and contraction of the casing.

The cantilevered strut member extends coaxial with a rigid support strut member and is adjustable with respect to the housing at the support end and may be fixed after adjustment by insertion thereon of an adjusting lock nut.

The cantilevered strut member allows the bearing preload to be maintained since expansion and contraction of the housing affects both bearings in the same sense.

SUMMARY OF THE INVENTION

The invention contemplates a simple mechanical structure for the mounting and assembly of a rotor within a casing to maintain a constant preload on the ball bearings within which the rotor is supported unaffected by wide variations of pressure within and external to the casings.

The invention further contemplates as an object a rugged mechanical assembly for mounting of a high speed reaction wheel used to vary attitudes of a space vehicle to eliminate off axis rotor vibrations due to variations in ball bearing preload.

It is a further object of this invention to provide a high speed precision rotor, casing and assembly for supporting a rotor that is easy to manufacture and maintains accuracy under wide variations of the casing expansion and contraction.

It is a further object of this invention to provide an assembly and bearing mounting for a high speed rotor within a casing wherein the bearing preload may be adjusted during operation of the rotor from a single side of the rotor.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

DESCRIPTION OF THE DRAWING

The figure is a horizontal sectional view of a rotor, mounting assembly and housing embodying the invention.

DESCRIPTION OF THE INVENTION

Referring to the drawing, the rotor and mounting assembly incorporated within the present invention is enclosed in a hollow housing 10 which may be rigidly mounted to a vehicle (not shown) in the case of a single axis torque application whereby a torque due to acceleration of a rotor 15 is applied about a spin axis 12.

The rotor 15 mounted within the hollow housing 10 is essentially a homogeneous mass having a heavy outer rim portion 16 connected by a web 18 with a hollow rotor shaft 20 extending coaxial with the spin axis 12 of the rotor 15. An inner rim portion 22 extends coaxially from the web 18 and supports a conventional squirrel cage rotor 24 of an A.C. induction motor 26.

A stator portion 27 of the A.C. induction motor 26 is mounted on an undercut section 28 of a projecting shoulder 30 which extends inwardly from a fixed end portion 31 of the hollow housing 10. The projecting shoulder 30 is hollow forming a bore 32 coaxial with the axis 12.

The hollow rotor 15 is mounted for spin within the casing 10 by means of the rotor shaft 20 being journalled at opposite ends 34 and 36 for receiving inner races 38 and 40 of angular contact type bearings 42 and 44 in abutting relationship cooperating with bearing balls 45 and 46. Outer bearing race 48 cooperates with the balls 45 and is held in fixed position adjacent bore 32 and an undercut section 50.

An outer race 52 of bearing 44 cooperates with the bearing ball 46 and is held in radial position by means of a tubular surrounding member 54 counterbored at an inner surface portion 51 for receiving the outer race 52 for axial and radial alignment. The tubular surrounding member 54 is held within the hollow housing 10 by a tubular shoulder member 56 projecting internally from an end portion 59 of the hollow housing 10. The tubular shoulder member 56 maintains the tubular member 54 and bearing 44 in a fixed radial position.

The tubular shoulder 56 is of such a dimension as to maintain the tubular member 54 in fixed radial position with a sliding relationship therebetween. A removable plate 58 mounted on the end portion 59 of the housing 10 is held in place by lock screws 57 screw threadedly engaged in the end portion 59 of the hollow housing 10. The plate 58 is removable to provide ready access to the right side of the hollow housing 10 upon the removal thereof. The plate 58 is concentrically bored and has internal screw threads 61 formed in the bored portion thereof.

A rigid strut member 60 extends from casing end portion 31, through the hollow rotor shaft 20 to the end 59 where it is screw threadedly engaged with lock nut 63 and at 62 in the internal screw threads 61 of the plate 58.

In order to preload the bearings 42 and 44, the fixed end portion 31 of the hollow housing 10 is concentrically bored and has internal screw threads 63 formed therein while a cantilevered strut member 70 which circumferentially surrounds the rigid strut member 60 is screw threadedly engaged by means of outer screw threads 72 to the internal screw threads 63 in the bored portion of the end portion 31 of the housing 10.

The cantilevered strut member is generally cylindrical in shape and extends coaxial with the axis 12 within the hollow rotor shaft 20 of rotor 15 and is fixedly attached to the housing 10 at only the one end 31. The cantilevered strut member 70 extends circumferentially about the rigid strut memebr 60 but is not in contact therewith. The cantilevered strut member 70 is externally threaded at the end 76 so that a lock nut 78 may be placed thereon in order to hold tubular member 54 in fixed axial position with respect to the bearing 44, whereby the lock nut 78 may be adjusted on the end 76 so as to reduce or lessen the pressure on the bearing outer race 52 in contact with the bearing ball 46.

Further, the cantilever strut member 70 may be adjusted axially with respect to the hollow housing 10 by adjustment of an internally screw threaded lock nut 86 on the screw threads 72 of the cantilevered strut member 70 and in an appropriate direction at the support end of the cantilever strut member 70 so as to effect additional preload adjustment through lock nut 78 and tubular member 54 engaging outer race 52 of bearing 44.

The cantilever strut member 70 is further internally screw threaded at 88 so as to threadedly engage a screw threaded outer surface end 90 of the rigid strut member 60 having lock nut 79 thereon so as to provide a rigid mechanical assembly of the rigid strut member 60 and the cantilever strut member 70 in relation to the hollow housing 10.

OPERATION

The pressure compensated operation within the contemplation of this invention may best be analyzed by considering the opposing ends of the hollow housing 10 effecting a movement to the left and right, one with respect to the other, because of a pressure differential existing between the housing interior and exterior.

In operation, the rotor 15 is driven by the electromagnetic field created by the A.C. induction motor 26 about the spin axis 12 and is mounted for rotation in the angular contact bearings 42 and 44 about the journalled ends 34 and 36 of the hollow rotor shaft 20 to maintain the rotor in axial and radial position. The cantilever strut member 70 maintains the angular contact force on the outer race 52 of bearing 44 which force transmitted through shaft 20 maintains bearing 42 under the same preload force.

The preload force may be initially adjusted at end 59 by removal of plate 58 giving access to lock nut 78 which may be turned in the appropriate direction to adjust the engagement of tubular member 54 against the outer race 52 of bearing 44. The preload force may be changed during actual operation when the housing 10 is sealed by turning the lock nut 86 on the support end of the cantilevered strut member 70.

Thus, for example, by turning the lock nut 86 in such direction as to cause withdrawal of the strut member 70 there will be effected an increase in the preload of bearings 42 and 44, since the force is transmitted through the strut member 70 and tubular member 54 held in fixed position by lock nut 78 to bearing 44, hollow rotor shaft 20 and bearing 42 against the shoulder 30 of the housing 10. Now, if the left end 31 of housing 10 expands slightly due to a pressure differential being created within and without the housing whereby the pressure within the housing is greater than the pressure outside the housing 10, the end 31 of the housing 10 in effect suffers a small movement to the left of the position shown in the drawing.

Such movement to the left of the end 31 of the housing 10 would instantaneously reduce the preload force on the bearing 42 since shoulder projection 30 releases the abutting relationship at bores 32 and 50 with the outer race 48 of the bearing 42. This effect is prevented in the invention because the rigid cantilevered strut member 70, being fixed with respect to the housing end 31, moves to the left with the end 31 of the housing 10 and therefore effects a movement to the left in an axial direction through the lock nut 78 and tubular member 54 to the outer race 52 causing a corresponding movement to the left of the bearing 44. The force transmitted through the bearing 44 causes a slight axial shift of the rotor shaft 20 of rotor 15 to the left in an axial direction from the position shown in the drawing. The journalled end 34 then shifts inner race 38 and the remainder of bearing 42 to the left which action maintains the preload of the bearing 42.

Similarly, if a pressure within the housing becomes less than the pressure external to the housing 10, the end 31 effects a closing movement with respect to end 59. The end 31 effects a movement to the right which would normally cause a greater instantaneous force on the bearing 42 greater than the preload force since the shoulder 30 effects a movement to the right forcing the bearing 42 to the right which force is transmitted through hollow rotor shaft 20 and bearing 44. Such excess force on the bearing 42 is prevented since the cantilevered strut member 70 being rigidly attached to the housing at the end 31 also moves to the right. The force transmitted through the bearing 42 and the rotor shaft 20 by movement to the right is transmitted to the bearing 44 whereby the outer race 52 forces the tubular member 54 to slide to the right. This movement is not prevented since lock nut 78 has moved with the slight movement of the strut member 70 to the right as has the housing end 31 rigidly mounting the cantilevered strut member 70.

Assuming again that the pressure within housing 10 become greater than the pressure external to the housing, the effect on the right end 59 and shoulder 56 of the housing 10 is to cause an axial shift to the right of the position shown in the drawing. This shift does not effect the bearing preload and the strut member 70 maintains the preload on the bearings since it is not attached to the end 59 of housing 10. The housing end 59 indirectly effects the housing end 31 but this occurs through the rigid strut member 60. As already described, movement of the end 31 of housing 10 effects the directional movement on cantilevered strut member 70 so as to cause no resultant change of the preload force on the bearings 42 and 44.

Further, assuming now that this pressure in the hollow housing 10 is less than pressure external to the housing, the same analysis holds true since such pressure differential causes axial shift of the end 59 to the left allowing the shoulder 56 to slide with respect to tubular member 54 while simultaneously maintaining tubular member 54 in fixed radial position. The shift toward the left in the axial direction of the housing end 59 does not effect bearing preload since the cantilevered strut member 70, controlling the preload on the bearings, is not attached to the end 59.

In conclusion, the assembly provides a simple, mechanical structure which maintains the ball bearing preload to constant predetermined value during severe changes of pressure within and without the housing 10. The novel arrangement maintains the spin of the rotor 15 about the axis 12 so as to prohibit vibratory effects from changes in bearing preload. Further, the proper selection of materials minimizes the simultaneous movements caused by the expansion and contraction of the sealed housing 10.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A pressure compensating rotor mounting assembly, comprising:
   a hollow housing;
   a rotor including a hollow rotor shaft mounted for rotation within the housing, said hollow shaft extending along the axis of the rotor;
   a hollow cantilevered strut rigidly attached at one end portion to said housing and having another end portion extending axially within the hollow rotor shaft;
   a pair of axially spaced radial bearings, each radial bearing having an inner bearing race and an outer bearing race, the inner bearing race being mounted circumferentially about the rotor shaft;
   a pair of shoulder members attached to said housing and extending therewithin, one of said shoulder members including means circumferentially surrounding the outer race of one of the radial bearings, and the other of said shoulder members including a tubular member axially movable in the other of said shoulder members and circumferentially surrounding the outer race of the other of the bearings, the shoulder members and the tubular member acting to maintain the radial bearings in fixed radial position; and
   means mounted on the extended other end portion of said hollow strut including the tubular member being axially movable relative to the hollow rotor shaft for adjusting the contact forces of the bearings on the hollow rotor shaft.

2. The mounting assembly as claimed in claim 1 further comprising:
   a ragid strut member attached at one end portion to an end of the housing and extending through the hollow cantilevered strut and attached at an opposite end portion within the one end portion of the hollow cantilevered strut, and
   means for adjusting the axial position of the rigid strut member and the hollow axial strut with respect to the housing.

3. The hounting assembly as claimed in claim 1 wherein:
   the rotor shaft is journalled at the ends thereof, each journalled end being encompassed by the inner race of one of the bearings; and
   the adjusting means mounted on the extended other end portion of the hollow cantilevered strut in which the means axially movable relative to said hollow rotor shaft including the surrounding tubular member having a counterbore therein for receiving the outer race of one of said bearings.

4. A pressure compensating mounting assembly comprising:
   a hollow housing;
   a hollow shaft mounted for rotation within the housing;
   a hollow cantilevered strut adjustably attached to said housing and having a suspended end portion extending axially through the hollow shaft;
   a pair of axially spaced radial bearings mounted circumferentially about the hollow shaft;
   a shoulder member affixed to an inner side surface of the housing for receiving one of said bearings; and
   another shoulder member affixed to an opposite inner side surface of the housing adjacent the suspended end portion of said cantilevered strut, said other shoulder member including means for receiving the other of said bearings, said last mentioned means being axially movable in said other shoulder member in relation to said hollow shaft for adjusting the contact forces of the bearings with respect to the hollow shaft.

References Cited

UNITED STATES PATENTS

| 2,771,778 | 11/1956 | Ryberg | 74—5 |
| 2,711,356 | 6/1955 | Ensinger | 74—5 XR |
| 2,990,718 | 7/1961 | Barnaby | 74—5 |
| 3,071,421 | 1/1963 | Jones et al. | 74—5 XR |
| 3,187,586 | 6/1965 | Evenson | 74—5 |

FOREIGN PATENTS 574,582  1/1946  Great Britain.

FRED C. MATTERN, Jr., Primary Examiner

M. ANTONAKAS, Assistant Examiner

U.S. Cl. X.R.

308—178